Oct. 4, 1960

I. F. DAVIDSON 2,954,833

ADJUSTABLE DOUBLE TRACK TRACTOR

Filed April 14, 1958

INVENTOR.
ISAAC F. DAVIDSON
BY
*T. R. Geisler*
ATTORNEY

Oct. 4, 1960
I. F. DAVIDSON
2,954,833
ADJUSTABLE DOUBLE TRACK TRACTOR
Filed April 14, 1958
3 Sheets-Sheet 3
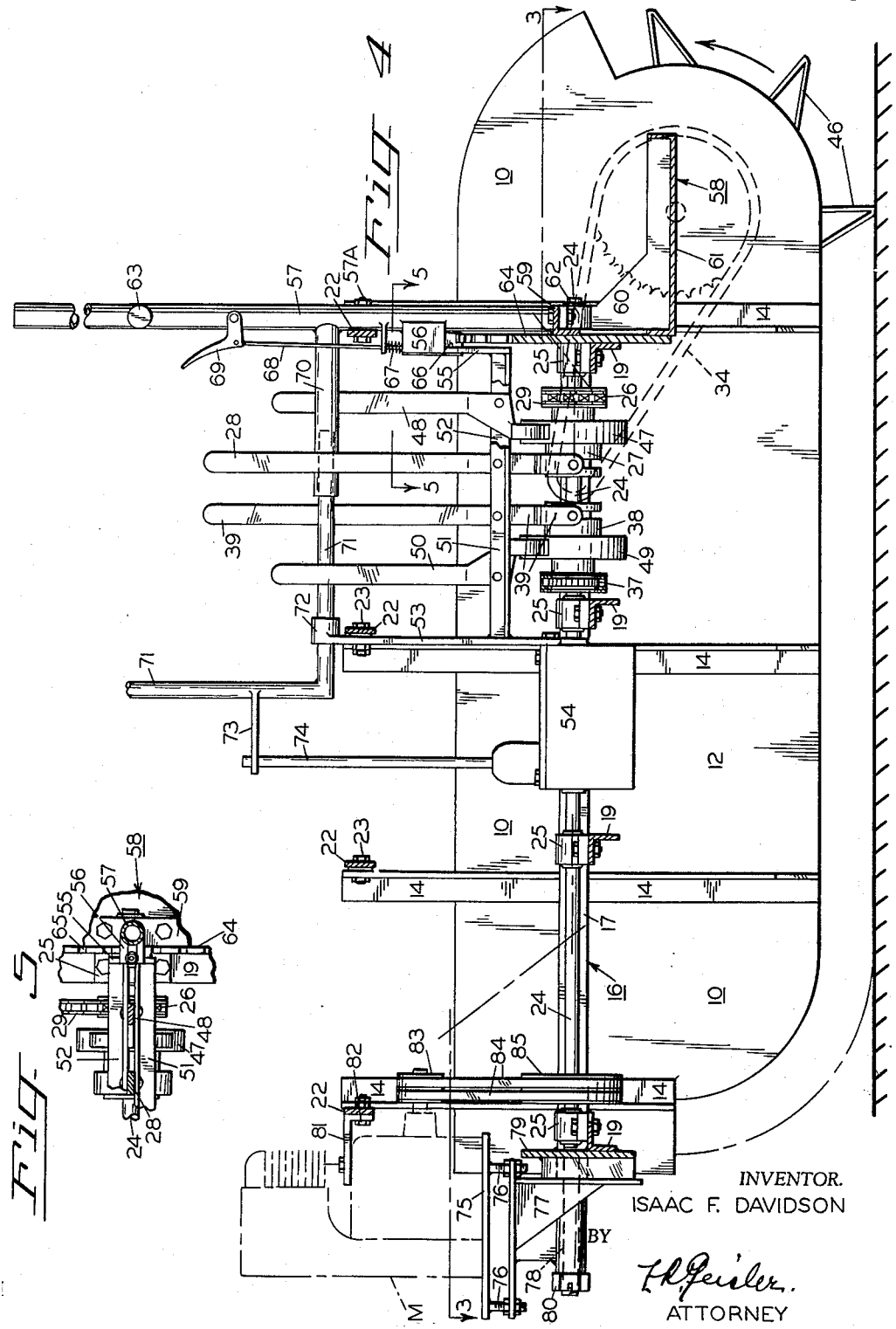
INVENTOR.
ISAAC F. DAVIDSON
BY
*T. R. Geisler*
ATTORNEY

United States Patent Office 2,954,833
Patented Oct. 4, 1960

2,954,833

ADJUSTABLE DOUBLE TRACK TRACTOR

Isaac F. Davidson, Portland, Oreg., assignor of one-half to Eugene L. Davidson, Alpine, Oreg.

Filed Apr. 14, 1958, Ser. No. 728,445

5 Claims. (Cl. 180—9.2)

This invention relates to track-laying tractors of the double track type in which the tractor vehicle is supported entirely on two identical, laterally spaced, endless tractor belts mounted at opposite ssides of the vehicle, and with the two tractor belt assemblies so connected with the power mechanism, which is mounted centrally on the tractor vehicle between the tractor assemblies, that the tractor belts may be driven either in unison or driven one at a time from the power mechanism.

One of the well known problems encountered with the use of such tractors on rough or hilly ground, and this is particularly true with the use of the small tractors commonly used in farming, is that the tractors can easily become overbalanced when traversing sloping ground or when encountering either a depression or an excesssively raised ground portion sufficient to cause one of the two tracks of the tractor to be lowered or raised considerably below or above the other. Fatal accidents resulting from tractors rolling over under such conditions continue to be of frequent occurrence. A special problem exists when a tractor is operating on snow across an inclined slope since the likelihood of becoming overbalanced is increased due to the fact that the greater weight on its lower track belt causes it to sink deeper into the snow and thus increases the tipping of the tractor.

Various attempts have been made to increase the operating stability and safety of tractors under conditions when one track of the tractor becomes raised above or lowered below the other, but such attempts have not been successful. The center of gravity of two-track tractors must generally be located considerably above the ground and when the two track assemblies are inclined substantially from the vertical, as a result of the tractor passing over sloping ground, this center of gravity, particularly with small tractors where the track assemblies are not spaced very far apart, often becomes positioned above the ground-engaging portion of the lower track assembly and under such conditions the rolling over of the tractor is practically inevitable.

An object of the present invention is to provide an improved double track tractor in which either one of the two entire track assemblies can be freely raised or lowered with respect to the other without excessively changing the center of gravity of the entire tractor.

A related object of the invention is to provide a double track tractor in which the two track assemblies can be made to remain in substantially vertical position even though the two track assemblies are entirely positioned at considerably different levels.

An additional object of the invention is to provide an improved double track tractor in which the operator of the tractor can readily cause the two track assemblies to be tilted sideways in either direction, thus to one side or the other, so as to cause the track assemblies to remain substantially vertical when the tractor subsequently passes over sloping ground, or even, if desired, to tilt into the slope of the sloping ground so as to increase still further the resistance of the tractor to any tendency to become overbalanced as a result of the slope of the ground.

A still further object of the invention is to provide an improved and simplified construction for a two-track tractor enabling the tractor to be adaptable for traversing relatively steep slopes but which construction will be simple and practical and adapted for being carried out with small tractors and tractors of light weight, and which construction will not involve high manufacturing costs.

The manner in which these objects and other incidental advantages are attained with the present invention, and the construction and manner of operation of the improved adjustable double track tractor embodying the present invention will be briefly described and explained with reference to the accompanying drawings.

In the drawings:

Fig. 4 is a sectional side elevation taken on the line 4—4 of Fig. 3; and

Fig. 5 is a fragmentary section taken on line 5—5 of Fig 4.

Figure 1:
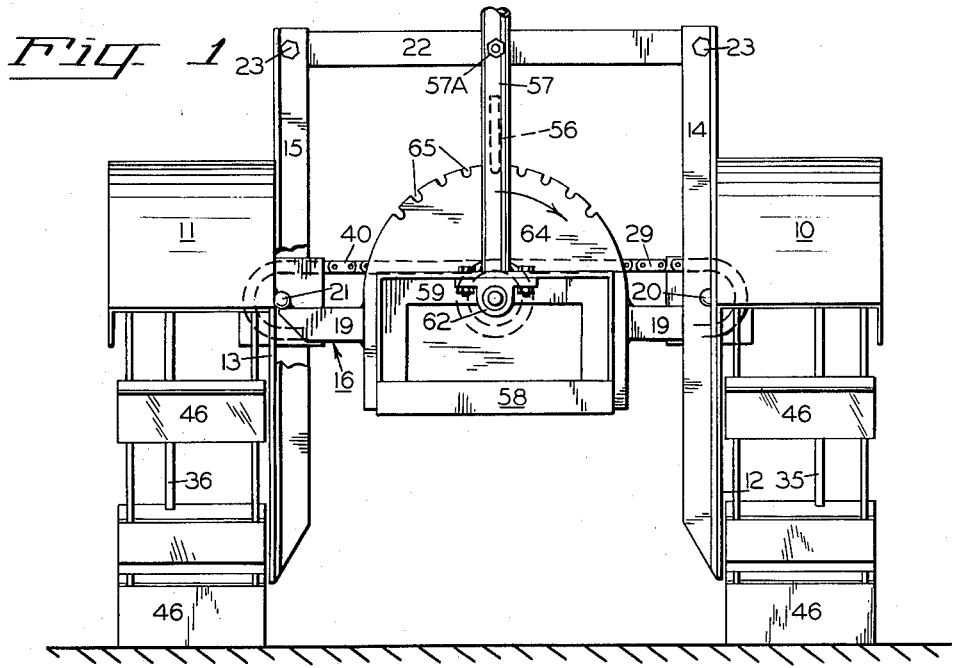
Fig. 1 is an end elevation of the tractor, taken on the line indicated at 1—1 in Fig. 3, with some minor details omitted for clarity, illustrating the tractor on level ground and thus with the bottom ground-engaging portions of the two tractor belts located in the same substantially horizontal plane.

Referring first to Fig. 1, the two tractor belt assemblies, arranged at the sides of the tractor respectively, are indicated in general by the reference characters 10 and 11. Each of these track assemblies includes an endless flexible track belt of suitable construction provided with suitable ground-engaging cleats 46. The track belt in each assembly passes over and around suitable supporting guide means (not shown) and around a driven wheel 35 or 36 at one end of its course and around an idle wheel (not shown) at the other end. Since such tractor belts are common and well known these need not be described further and the tractor belts themselves form no part of the present invention. The entire weight of the tractor vehicle is of course carried on the tractor belts at all times. The power means for driving the two tractor belts will be referred to later.

The two tractor belt assemblies 10 and 11 include housings for the endless track belts with mountings in the housings for the guide means and bearing mountings for the track belt supporting wheels. The inner side walls 12 and 13 of the housings for the assemblies 10 and 11 respectively (see also Fig. 3) consist each of a rigid plate reinforced by spaced vertical angle iron ribs 14 and 15, which are secured to the wall plates 12 and 13 respectively preferably by welding.

Figure 3:
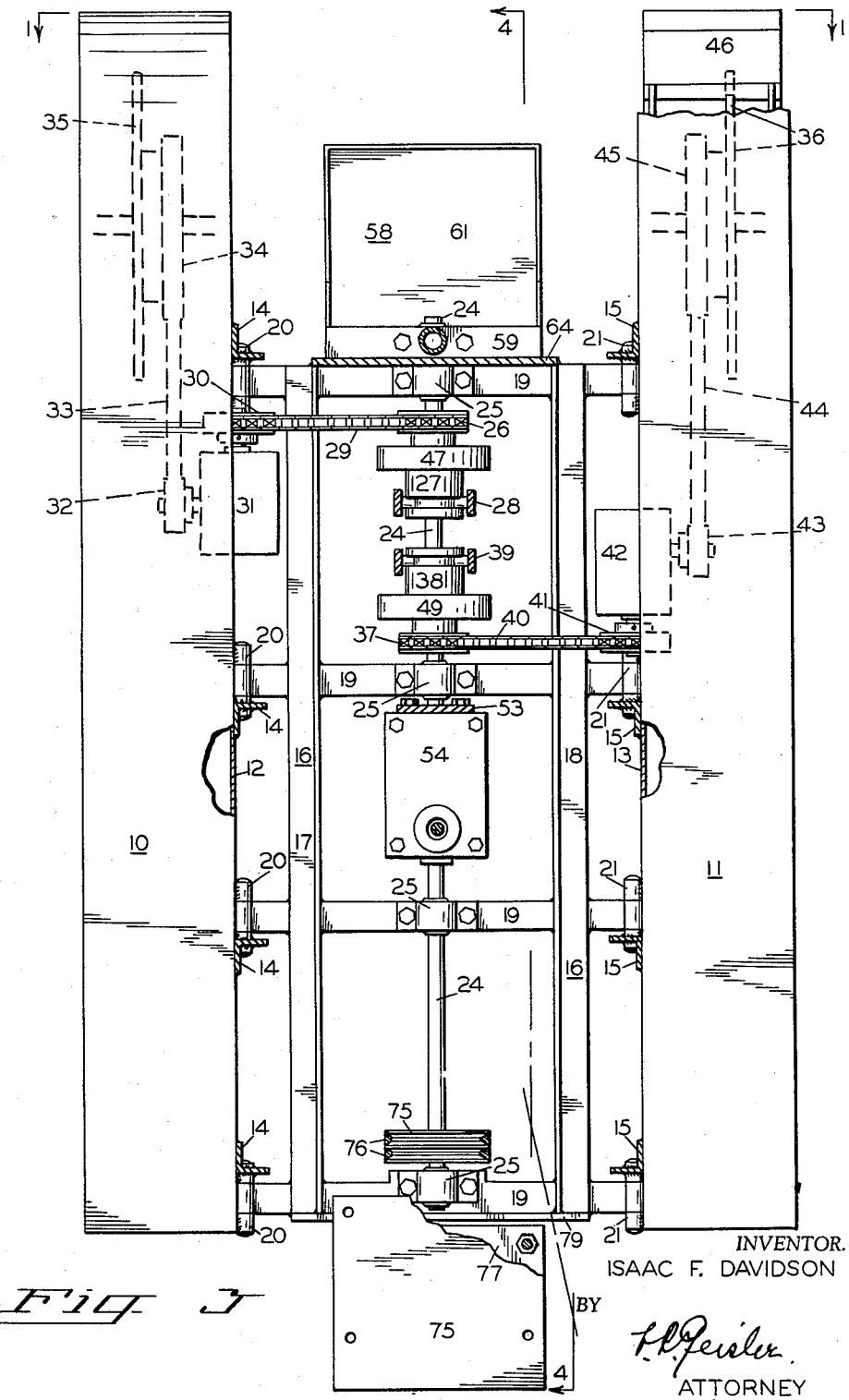
Fig. 3 is a horizontal section of the tractor taken on the line indicated at 3—3 in Fig. 4.

The frame structure to which the two tractor belt assemblies are mounted includes a rectangular main base frame 16 (see Fig. 3), preferably formed of angle iron members, and consisting of two longitudinal side members 17 and 18 connected by a plurality of transverse members 19 (there being four such transverse members in the frame as illustrated in Fig. 3), the members of the base frame 16 being welded to each other so as to form a base frame structure which will be simple, strong and rigid without having excessive weight. The side walls or plates 12 and 13 with their upright reinforcing members 14 and 15 are hingedly connected to the respective ends of the transverse frame members 19 by the two series of hinges 20 and 21. The hinges in these two series are identical and the hinge pins or bolts of the hinges in each series are in exact axial alignment.

Figure 2:
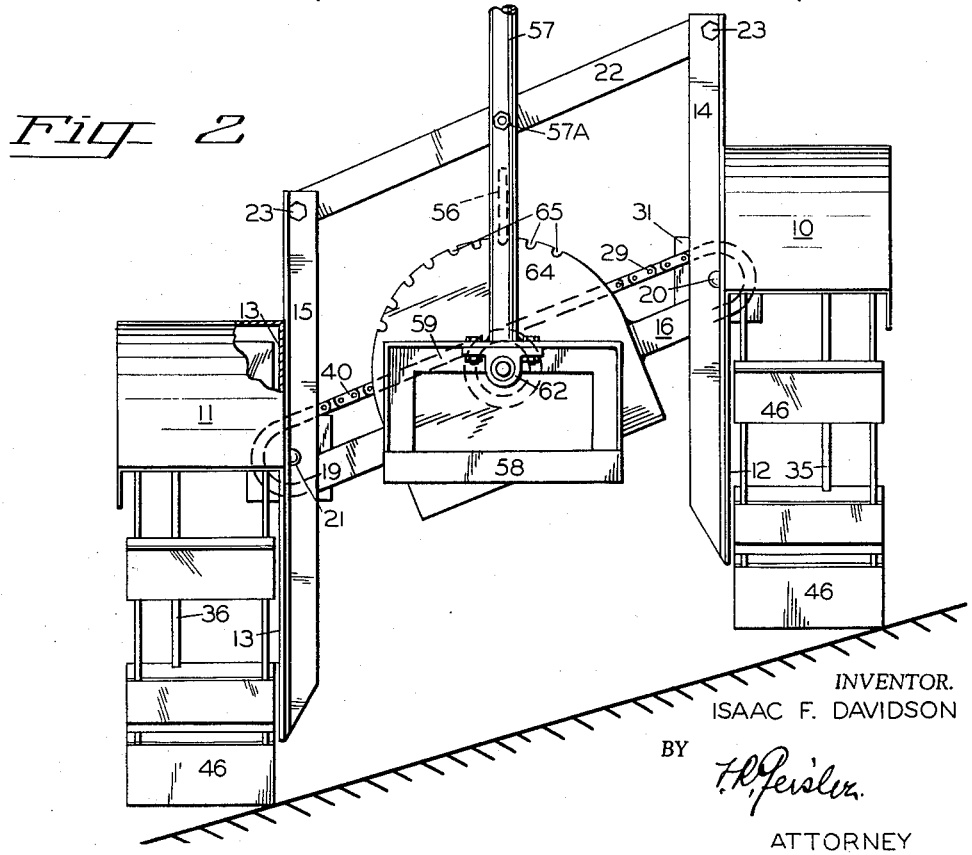
Fig. 2 is a similar elevation but illustrating the tractor traversing sloping ground, with the two track assemblies nevertheless positioned vertically in spite of the fact that the two assemblies are located at different levels and in spite of the slope of the ground on which the tractor assemblies rest.

The opposite upright reinforcing members 14 and 15 on the side walls of the tractor belt assemblies have their top ends connected by transversely extending, upper crossbars 22 (Figs. 1, 2 and 4). These crossbars 22 are parallel to the transverse frame members 19 in the base frame 16 and are all spaced the same distance above the corresponding transverse frame members. These upper crossbars 22 are pivotally connected to the upright members 14 and 15 by suitable pivot bolts 23. Thus the base frame 16, the upright members 14 and 15 and side plates 12 and 13 which are hingedly connected to the base frame 16, and the pivotally mounted connecting upper crossbars 22, form a composite parallelogram frame structure which, as hereinafter explained, will be in the normal rectangular arrangement illustrated in Fig. 1 when the tractor is operating on level ground, but which is also capable of being moved into various parallelogram arrangements such as that shown, by way of example, in Fig. 2.

The main drive shaft 24 (Figs. 3 and 4) for the tractor extends longitudinally along the center of the main base frame 16, being supported in suitable journal bearings 25 secured to the transverse frame members 19. A sprocket 26 is mounted on the drive shaft 24 and is adapted to be rotated by the drive shaft through the intermediary of a friction disc clutch assembly indicated in general by the reference character 27 which is operated by a clutch lever 28 (Fig. 4) having a forked yoke at the bottom which engages the peripheral groove in a clutch sleeve. This type of clutch is old and well known and therefore need not be described further. Consequently, by manipulation of the lever 28 the sprocket 26 can be caused either to be rotated by the drive shaft 24 or to remain idle while the drive shaft continues to rotate.

The sprocket 26 is connected by means of the sprocket chain 29 with a sprocket 30 which forms part of the reduction bevel gear assembly indicated in general at 31 in Fig. 3, and this includes a sprocket 32 which is connected by sprocket chain 33 with a sprocket 34 attached to the drive wheel 35 for the tractor belt of the tractor belt assembly 10. As will be evident from Fig. 3, the axis of the connected sprocket 30 must be in alignment with the axes of the hinge bolts in the series of hinges 20 by which the entire tractor belt assembly 10 is connected to the base frame 16.

A second sprocket 37 (Fig. 3) is similarly carried on the drive shaft 24 and driven through the intermediary of a similar friction clutch assembly 38 operated by a similar clutch control lever 39. This sprocket is connected by sprocket chain 40 with a sprocket 41 forming part of a similar reduction bevel gear assembly 42 through which a sprocket 43 is caused to drive a sprocket chain 44 and a sprocket 45 connected to the drive wheel 36 of the tractor belt in the tractor belt assembly 11. Consequently the tractor belts in the two tractor belt assemblies 10 and 11 can be driven in unison from the main drive shaft 24 or each tractor belt may be driven alone.

A brake drum 47 (Figs. 3 and 4) is connected with the sprocket 26 and is adapted to be engaged by a friction brake lever 48 (Fig. 4) to hold the sprocket against rotation when the sprocket is disconnected from the drive shaft 24. Similarly a brake drum 49 is connected with a sprocket 37 and is adapted for engagement by the friction brake lever 50.

The clutch control levers 28 and 39 and the brake levers 48 and 50 are pivotally supported between a pair of parallel angle iron members 51 and 52. These members 51 and 52 are secured at one end to a central vertical support plate 53 (Fig. 4) which is pivotally attached near its upper end to one of the upper cross bars 22 at the center of such cross bar. The bottom of the support plate 53 is secured to a gear box 54 which houses the various gears through which the two sections of the drive shaft 24 are connected. The gear box 54 is carried by means of suitable bearings on the ends of the two gear-connected portions of the drive shaft. The members 51 and 52 are secured at their other ends to a support plate 55 which extends downwardly from a bracket 56 and the bracket 56 is secured on an upstanding control post 57, the support plate 55 being spaced from but parallel to the control post 57.

The bottom of the control post 57 is welded to the central portion of the top of a frame for a platform 58 on which platform the operator of the tractor stands when driving the tractor. The frame for the platform 58 includes a top angle iron member 59, a pair of side plates 60 (one of which is shown in Fig. 4), and a bottom plate 61 having rib flanges at opposite ends for strengthening this bottom plate. The members of the platform assembly are welded together so as to form a strong and light weight construction. The platform 58 is rotatably supported on the end of the main drive shaft 24 by means of a bearing lug 62 which is secured to the top angle iron member 59 and centrally positioned on the same, as shown best in Figs. 1 and 2. Thus the platform assembly 58 and the control post 57, which is rigidly connected to the platform assembly, can be rocked on the end of the drive shaft 24. The control post 57 is pivotally attached to the adjacent upper frame crossbar 22 at the center of the crossbar by means of a pivot bolt 57A. Therefore the control post 57 is always parallel to the side walls 12 and 13 and to the angle iron frame members or reinforcing ribs which are secured to the side walls 12 and 13 of the tractor belt assembly.

The upper portion of the control post 57 preferably carries a pair of hand holds 63, one of which is shown in Fig. 4, extending on opposite sides of the control post. The operator of the tractor stands on the platform 58 and, by firmly grasping the control post 57, can swing the post toward one side or the other. In other words, as will be apparent from Figs. 1 and 2, the operator on platform 58 can cause the control post 57, and therewith upright members 14 and 15 and the side walls 12 and 13, and consequently the entire tractor belt assemblies 10 and 11, to swing to one side or the other with respect to the main base frame 16 and the upper cross bars 22, the upper crossbars 22 always remaining parallel to the transverse members 19 of the base frame 16. When the tractor moves from the level ground position illustrated in Fig. 1 onto a sloping ground surface illustrated in Fig. 2, where the tractor belt in the tractor belt assembly 10 will travel at a higher level than the tractor belt in the opposite belt assembly 11, for example, the operator, by swinging the control post toward the right (as viewed in Figs. 1 and 2) can cause the upright members 14 and 15 and the tractor belt assemblies, due to the hinge mountings 20 and 21 and the pivot bolts 23, to remain in substantially vertical position even though the main base frame 16, which will be substantially parallel to the ground, should be inclined at a considerable angle from the horizontal. This is the important feature of the invention.

It will also be apparent that the operator, on the platform 58, can tilt the tractor belt assemblies to one side or the other in preparation for the moving of the tractor belts onto separate levels, and furthermore, when the tractor is obliged to move across unusually steep ground, the operator can even cause the tractor belt assemblies to tilt to such extent as to lean in toward the hill slope instead of remaining vertical, thus reducing still further any possibility of the tractor becoming overbalanced.

A holding plate 64, serving as part of the means for retaining the tractor belt assemblies in desired relative position with respect to the main base frame 16, is firmly secured to the transverse frame member 19 located immediately adjacent the platform 58, being provided with an opening through which the end of the drive shaft 24 extends. The top edge of this holding plate 64 forms an arc of a circle concentric with the drive shaft 24, and this top edge is provided with a seris of notches 65 adapted for engagement by a latch element 66 (Fig. 4) which latch element is slidably mounted for limited movement up and down in the bracket 56. The latch element 66 is normally held in lowered, notch-engaging position by spring means 67. A cable 68 is attached to this latch element 66 and in turn is connected to a lever handle 69 pivotally mounted on the control post 57. The operator of the tractor, standing on the platform 58, when desiring to tilt the control post 57, and therewith tilt the tractor belt assemblies toward either side, first lifts the latch element 66 by moving the lever handle 69 and then, after swinging the control post to the extent desired, permits the latch element to return to locking position so as to lock the control post in the desired position of angularity with respect to the main base frame 16, and, in other words, locks the tractor belt assemblies in the desired position with respect to the base frame to which the two tractor base assemblies are hingedly connected.

A horizontal tubular bearing arm 70 (Fig. 4), secured on the control post 57, rotatably and slidably supports one end of an L-shaped gear shift control handle 71 which is also slidably and rotatably supported in a bearing 72 formed at the upper end of the central upright plate 53. An arm 73 secured to this handle 71 is provided with an aperture through which the upper end of a gear shift lever 74 extends. The gear shift lever 74 operates in the well known manner, common to gear shifts employed in many automotive vehicles, to shift the gears in the gear box 54 by which the two sections of the drive shaft 24 are connected. As will be apparent from Fig. 4, the operator, by manipulating the gear shift handle 71, can shift the gear lever 74 in any one of four directions; thus he can pull the handle 71 towards him, or thrust it away from him, or he can rock the handle to either side. The arrangement of the various gears in the gear box 54 and the manner in which the two sections of the drive shaft 24 are connected through the selected gears need not be described since this is well known and does not constitute part of the present invention.

The tractor engine, indicated at M in Fig. 4, is secured on a base 75 which in turn is adjustably mounted, by the adjusting bolts 76, on the mounting bracket 77. The mounting bracket 77 is pivotally supported on a stub shaft 78 which is rigidly secured to a plate 79 so as to be in axial alignment with the drive shaft 24. The plate 79 is rigidly secured to the adjacent transverse member 19 of the main base frame 16. The bracket 77 is rotatably supported on the stub shaft 78. The outer end of the stub shaft 78 is threaded and a nut 80 holds the bracket 77 on the stub shaft. A top support bracket 81 is rigidly secured to the casing for the engine and this top support bracket 81 is also attached by a pivot bolt 82 to the center of the adjacent upper cross bar 22. In this way the engine is mounted in alignment with the control post 57 and in parallelism with the two tractor belt assemblies and the entire engine assembly will be tilted in unison with the control post 57 and the two tractor belt assemblies, with respect to base frame 16, whenever the operator moves the control post 57 to one side or the other. This is a further important feature, since the position of the entire engine assembly, due to the weight of the engine, influences to some extent the center of gravity of the tractor.

Drive pulleys 83 on the engine shaft are connected by suitable V-belts 84 with pulleys 85 secured on the engine section of the drive shaft 24. A suitable engine control ignition switch (not shown) is preferably mounted on the control post 57 or at some other location convenient to the operator on the platform 58 and is connected with the engine by a conductor wire so as to enable the operator of the tractor to have full control of the engine and the entire operation of the tractor from his position on platform 58.

Various modifications in the individual parts of the tractor would be possible without departing from the principle of the invention. It is, however, essential that the two tractor belt assemblies should be parallel at all times and under all conditions, that they should be so connected with the central main frame of the tractor that their angularity with respect to the main frame can be adjusted, and that the adjustment of their position should be under the control of the operator of the tractor.

I claim:

1. In an adjustable double track tractor of the character described, a main base frame, a pair of rigid side frames hingedly connected to opposite sides of said main frame respectively on parallel hinge lines, a tractor belt assembly mounted on each side frame, said tractor entirely supported by said tractor belt assemblies, transversely extending linkage in parallelism with said main frame pivotally connected to said side frames forming a hinged parallelogram construction with said side frames and said main frame and maintaining said side frames always in parallelism with each other while enabling said side frames to change their angularity with said main frame and thus to control the position of the center of gravity of the entire tractor with respect to said tractor belt assemblies, controllable means for changing the angularity of said side frames with said main frame and said linkage in said parallelogram construction, and means for maintaining a desired position of angularity of said side frames with said main frame in said parallelogram construction.

2. In an adjustable double track tractor, a main substantially rectangular base frame, a pair of rigid side frames hingedly connected to opposite sides of said main frame respectively on parallel hinge lines, a tractor belt assembly mounted on each side frame, said tractor entirely supported on said tractor belt assemblies, transversely extending linkage in parallelism with said main frame pivotally connected to said side frames forming a hinged parallelogram construction with said side frames and said main frame and maintaining said side frames always in parallelism with each other while enabling said side frames to change their angularity with said main frame and thus to control the position of the center of gravity of the entire tractor with respect to said tractor belt assemblies, manually operable means for changing the angularity of said side frames with said main frame and said linkage in said parallelogram construction, means for maintaining a desired position of angularity of said side frames with said main frame in said parallelogram construction, a power drive assembly for said tractor belts, said drive assembly including an engine, a main drive shaft driven from said engine, said main drive shaft mounted on said main frame and extending parallel to said side frames, means connecting each of said tractor belts separately with said main drive shaft, and separate control means for said latter mentioned connecting means.

3. In a double track tractor, a main substantially rectangular base frame, a pair of rigid side frames hingedly connected to opposite sides of said main frame respectively on parallel hinge lines, a tractor belt assembly mounted on each side frame, said tractor entirely supported on said tractor belt assemblies, means for maintaining said side frames always in parallelism with each other while enabling said side frames to change their angularity with said main frame and thus to control the position of the center of gravity of the entire tractor with respect to said tractor belt assemblies, manually operated means for changing the angularity of said side frames with said main frame, said latter means including a control post pivotally mounted on said base frame and extending upwardly therefrom, said control post connected with said first mentioned means and held in parallelism with said side frames thereby, and cooperating latching means on said control post and on said main frame for holding said control post and therewith said side frames in desired position of angularity with said main frame.

4. In a double track tractor, a main base frame, a pair of rigid side frames hingedly connected to opposite sides of said main frame respectively on parallel hinge lines, a tractor belt assembly mounted on each side frame, said tractor entirely supported by said tractor belt assemblies, means located above said main frame for maintaining said side frames always in parallelism with each other while enabling said side frames to change their angularity with said main frame and thus to control the position of the center of gravity of the entire tractor with respect to said tractor belt assemblies, manually operable means for changing the angularity of said side frames with said main frame, said latter means including a control post pivotally mounted on said base frame and extending upwardly therefrom, said control post connected with said first mentioned means and held in parallelism with said side frames thereby, cooperating latching means on said control post and on said main frame for holding said control post and therewith said side frames in desired position of angularity with said main frame, a power drive assembly for said tractor belts, said drive assembly including an engine, an engine housing, and a main drive shaft driven from said engine, means connecting said tractor belts separately with said main drive shaft, and separate control means located in proximity to said control post for said latter mentioned connecting means.

5. An adjustable double track tractor including a main base frame, a pair of rigid side frames hingedly connected to opposite sides of said main frame respectively on parallel hinge lines, a tractor belt assembly mounted on each side frame, said tractor entirely supported on said tractor belts, means for maintaining said side frames always in parallelism with each other while enabling said side frames to change their angularity with said main frame and thus to control the position of the center of gravity of the entire tractor with respect to said tractor belt assemblies, manually operable means for changing the angularity of said side frames with said main frame, said latter means including a control post pivotally mounted on said base frame and extending upwardly therefrom, said control post connected with said first mentioned means and held in parallelism with said side frames thereby, cooperating latching means on said control post and on said main frame for holding said control post and therewith said side frames in desired position of angularity with said main frame, a power drive assembly for said tractor belts, said drive assembly including an engine, an engine housing, and a main drive shaft driven from said engine, said main drive shaft mounted on said main frame along the longitudinal center thereof, said engine housing pivotally mounted on said main frame co-axially with said drive shaft, said engine housing connected with said first mentioned means and held in parallelism with said post and said side frames thereby, means connecting said tractor belts separately with said main drive shaft, and separate control means located in proximity to said control post for said latter mentioned connecting means.

References Cited in the file of this patent

UNITED STATES PATENTS

| Number | Name | Date |
|---|---|---|
| 1,131,394 | Loeffler | Mar. 9, 1915 |
| 1,151,561 | Bollinger | Aug. 31, 1915 |
| 1,455,466 | Wickersham | May 15, 1923 |
| 1,708,104 | Norelius | Apr. 9, 1929 |
| 1,836,623 | Silvestri | Dec. 15, 1931 |
| 2,063,035 | Fuller et al. | Dec. 8, 1936 |
| 2,693,162 | Poche | Nov. 2, 1954 |

FOREIGN PATENTS

| Number | Country | Date |
|---|---|---|
| 636,228 | Great Britain | Apr. 26, 1950 |
| 250,022 | Italy | Sept. 3, 1926 |